US 8,051,213 B2

(12) United States Patent
Van Hensbergen et al.

(10) Patent No.: US 8,051,213 B2
(45) Date of Patent: Nov. 1, 2011

(54) METHOD FOR SERVER-DIRECTED PACKET FORWARDING BY A NETWORK CONTROLLER BASED ON A PACKET BUFFER THRESHOLD

(75) Inventors: Eric Van Hensbergen, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2063 days.

(21) Appl. No.: 10/165,066

(22) Filed: Jun. 6, 2002

(65) Prior Publication Data

US 2003/0229713 A1 Dec. 11, 2003

(51) Int. Cl.
*G06F 15/16* (2006.01)
(52) U.S. Cl. .......................................... 709/250; 709/239
(58) Field of Classification Search .......... 709/201–250; 370/238, 401; 713/201, 153
See application file for complete search history.

(56) References Cited

U.S. PATENT DOCUMENTS

| | | | | |
|---|---|---|---|---|
| 5,477,547 A | * | 12/1995 | Sugiyama | 370/401 |
| 5,802,366 A | * | 9/1998 | Row et al. | 709/250 |
| 6,084,858 A | * | 7/2000 | Matthews et al. | 370/238 |
| 6,101,543 A | * | 8/2000 | Alden et al. | 709/229 |
| 6,230,200 B1 | * | 5/2001 | Forecast et al. | 709/226 |
| 6,243,379 B1 | | 6/2001 | Veerina et al. | |
| 6,262,976 B1 | | 7/2001 | McNamara | |
| 6,321,336 B1 | | 11/2001 | Applegate et al. | |
| 6,628,654 B1 | | 9/2003 | Albert et al. | |
| 6,751,728 B1 | * | 6/2004 | Gunter et al. | 713/153 |
| 6,779,035 B1 | | 8/2004 | Gbadegesin | |
| 6,779,039 B1 | * | 8/2004 | Bommareddy et al. | 709/238 |
| 6,880,089 B1 | * | 4/2005 | Bommareddy et al. | 713/201 |
| 6,968,394 B1 | * | 11/2005 | El-Rafie | 709/245 |
| 6,970,913 B1 | * | 11/2005 | Albert et al. | 709/217 |
| 2001/0037358 A1 | * | 11/2001 | Clubb et al. | 709/203 |
| 2002/0065938 A1 | * | 5/2002 | Jungck et al. | 709/246 |

OTHER PUBLICATIONS

Bux et al., Technologies and building blocks for fast packet forwarding, Communications Magazine, IEEE, vol. 39, issue 1, Jan. 2001, pp. 70-77.*
AUS920020080US1, Server Network Controller Including Packet Forwarding and Method Therefor.
U.S. Appl. No. 09/998,048.

* cited by examiner

*Primary Examiner* — Andrew Caldwell
*Assistant Examiner* — Christopher Biagini
(74) *Attorney, Agent, or Firm* — Mitch Harris, Atty at Law, LLC; Andrew M. Harris; Libby Z. Toub

(57) ABSTRACT

A network controller improves load-balancing within a network system without requiring an intelligent switch having TCP splicing capability. The network controller forwards connections in response to directives from the connected server, permitting connection splicing within the network controller, but in response to a determination within the server that a connection to an alternative node is more desirable. The server detects that a packet buffer for an original destination node exceeds a threshold and sends a command to the network controlled to forward connections to an alternate destination node. The alternative node connection can be determined based on data availability, server load or other criteria. The packet forwarding mechanism and can be implemented very compactly within the firmware of the network controller and the server forwarding control can be communicated via the network controller device driver.

2 Claims, 4 Drawing Sheets

METHOD FOR SERVER-DIRECTED PACKET FORWARDING BY A NETWORK CONTROLLER BASED ON A PACKET BUFFER THRESHOLD

CROSS-REFERENCE TO RELATED APPLICATIONS

The present application is related to previously-filed U.S. patent application: "SYSTEM AND METHOD FOR KNOWLEDGABLE NODE INITIATED TCP SPLICING" Ser. No. 09/998,048 filed on Nov. 29, 2001 by the same inventors and having the same assignee. The present application is also related to U.S. patent application "SERVER NETWORK CONTROLLER INCLUDING PACKET FORWARDING AND METHOD THEREFOR" Ser. No. 10/165,068 filed concurrently herewith by the same inventors and having the same assignee. The specifications of both of the above-referenced patent applications are incorporated herein by reference.

BACKGROUND OF THE INVENTION

1. Technical Field

The present invention relates generally to networked computer systems, and more specifically, to a server network controller, associated firmware and server software.

2. Description of the Related Art

Networked computer systems, including local area networks (LANs) and wide area networks (WANs) such as the Internet, have increased bandwidth demand due to the rapidly increasing number of network installations and network users. The demand for increased bandwidth, especially on the Internet and connected sub-networks such as intra-nets, has been met by installing increasing numbers of network servers, increasing the number of network nodes. There is a need for scalability in the above-described network systems and applications, so that the network systems can be expanded as the need for increased bandwidth continues.

Typically, network switches handle load distribution in multiple server connections. Intelligent switches may route connection requests to particular servers (back-end nodes) based on a parsing of the request to determine the type or location of requested content (layer-7 or application layer switching) or standard switches may simply "spray" connection requests among servers in order to evenly distribute the network load. While a switch may filter connections based on content type, protocol type or connection age, switches do not maintain detailed information about network status and therefore other techniques must be employed to provide a rapid and robust response to changes in network status.

The above-incorporated patent application provides an alternative to routing connection requests at the switch by providing a mechanism that determines appropriate connection forwarding at a back-end node. A connection is forwarded by the switch in response to receiving a message from the back-end node handling the original connection request. While this mechanism provides intelligent forwarding of connections in that the back-end nodes generally have more information regarding network loading status and the availability and latency of requested content, the solution described requires an intelligent switch. Further, the solution described in the above-incorporated patent application has a slow response to changes in network status and content availability, as the switch routing tables must be updated in response to control messages transmitted from the back-end nodes to the switch.

Therefore, it would be desirable to provide an improved network connection routing method and system that does not require an intelligent switch and that has a fast response to changes in server load and content availability.

SUMMARY OF THE INVENTION

The above objective of providing an improved network connection routing method and system is achieved in an intelligent network controller. The network controller may be an intelligent peripheral installed within a server or may be a network processor (NP) coupled to a server. The method and system forward connections by receiving the connection at a server node and determining within the server whether or not another node should handle the connection. The server determines whether to forward the connection by detecting that a size of a packet buffer for an original destination node has exceeded a predetermined threshold. In response to determining that another node should handle the connection, the network controller forwards the connection by sending a command to the network controller to forward the connection. The network controller forwards the connection by performing header mangling within the network controller. The packet destination addresses are modified to reflect the address of the other node and the source address is modified to reflect a node of the network controller. Responses received from the other node are modified to indicate a response from the original destination node, thus making the connection forwarding transparent to external switches and other devices.

The method and system may be implemented by program instructions in firmware within a network controller and software (device driver) within the server, forming a computer program product in accordance with embodiments of the present invention.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

Figure 1:
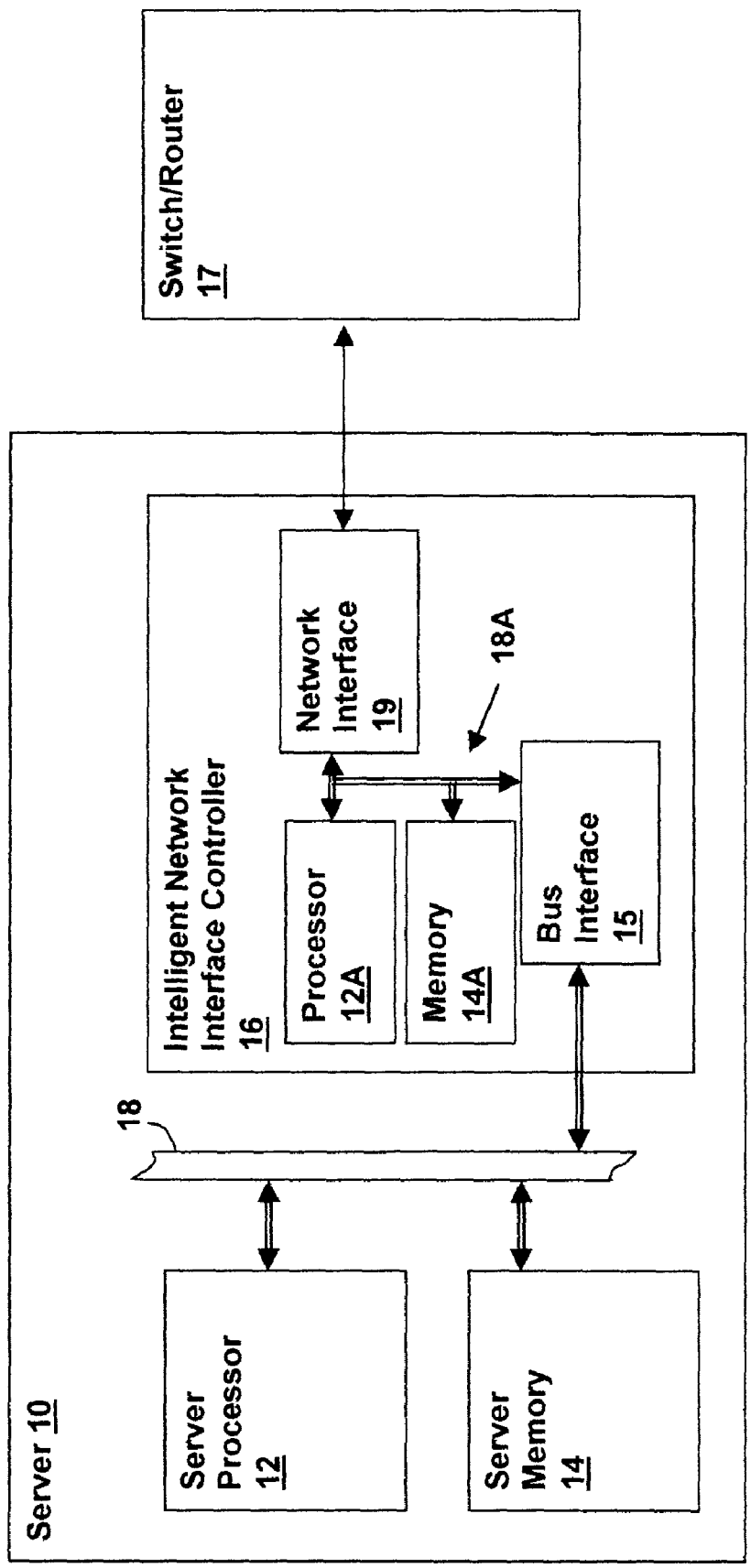
FIG. 1 is a block diagram depicting a server connected to a network and including a network controller interface in accordance with an embodiment of the invention.

Referring to the figures, and in particular to FIG. 1, a network server 10 including an intelligent network interface controller 16 in accordance with an embodiment of the invention is depicted. Server 10 incorporates a server processor 12 for executing server program instructions and a server memory 14 coupled to server processor 12 via a Peripheral Component Interconnect (PCI) or other local bus 18 for storing server program instructions and data. Network controller 16 is also coupled to bus 18, providing a pathway for communications between server processor 12, server memory 14 and network controller 16.

Network controller 16 includes a controller processor 12A for executing controller program instructions and is coupled via a local bus 18A to a controller memory 14A for storing controller program instructions and data, including data buffers for network packet storage. A bus interface 15 couples controller processor 12A and controller memory 14A to bus 18, providing a mechanism for communication between applications executed by server processor 12 and program instructions executed by processor 12A from memory 14A, which may be firmware instructions stored in non-volatile memory, downloadable software instructions stored in random access memory (RAM) or other suitable mechanism for providing instructions to controller processor 12A for implementing methods in accordance with embodiments of the present invention.

A network interface 19 is coupled to local bus 18A for communicating network packets (generally transmission control protocol/Internet protocol (TCP/IP) packets) between external network devices and server 10. A switch/router 17 is shown connected to network interface 19, but multiple devices and other types of connections (e.g., bridges, other servers) may be provided depending on the network connections required for particular applications. The present invention provides a mechanism for "TCP splicing" that resides entirely within server 10, so switch/router 17 may be a simple switch, in contrast to the switch of the above-incorporated patent application that provides TCP splicing using a mechanism distributed across a switch and the server.

Filtering of connections may be based on one or more of several criteria: age of connection (including new connection detection), type of connection (e.g., hypertext transfer protocol (HTTP), file transfer protocol (FTP), or e-mail) and protocol (e.g., layer 3 or layer 4 connections). For example, a first server may be optimized for short term connections, so all new connections may be routed to the first server, while a second server may be used for long-term connections and all connections for which a sequence number exceeds a predetermined number are then spliced to the second server. Another example is where an e-mail server and a web server are coupled to a common front-end switch. An intelligent network controller in each server can splice connections, avoiding reception and retransmission by each server of requests and data for the other server, without requiring Layer-7 type routing at the switch.

Figure 2:
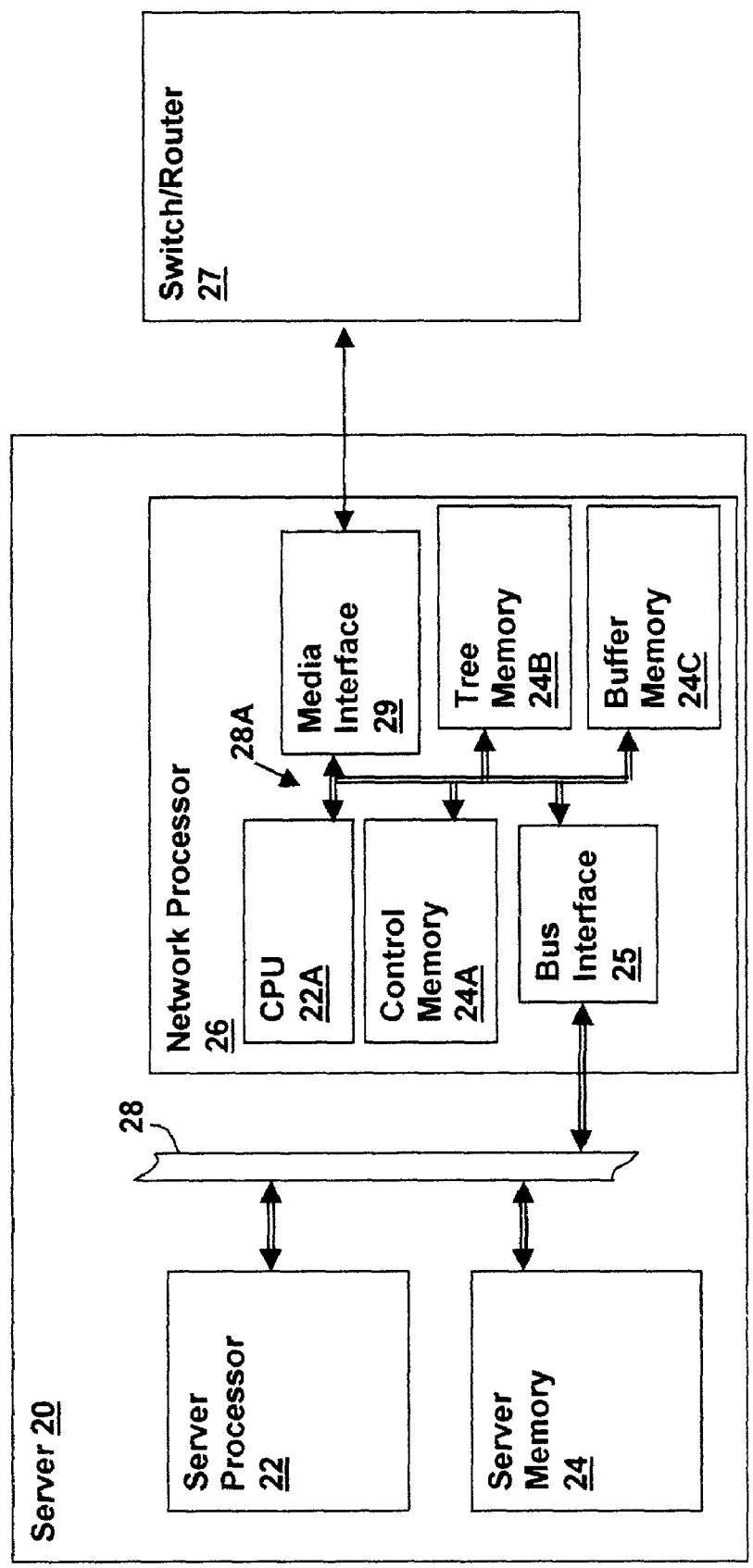
FIG. 2 is a block diagram depicting a server connected to a network and including a network processor in accordance with an embodiment of the invention.

Referring now to FIG. 2, a server 20 including a network processor 26 in accordance with an embodiment of the invention is depicted. Server 20 incorporates a server processor 22 for executing server program instructions and a server memory 24 coupled to server processor 22 via a Peripheral Component Interconnect (PCI) or other local bus 28 for storing server program instructions and data. Network processor 26 is also coupled to bus 28, providing a pathway for communications between server processor 22, server memory 24 and network processor 26.

Network processor 26 includes a central processing unit 22A for executing program instructions and is coupled via a local bus 28A to a control memory 24A for storing program instructions and data. Network processor 26 is also coupled to tree memory 24B for storing filter trees and packet processing trees that may be dynamic or static protocol trees. Network processor 26 is also coupled to buffer memory 24C for providing packet storage. Trees within network processors provide packet routing and manipulation. The trees are compiled and downloaded to tree memory 24B and provide instructions to dedicated hardware engines within network processor 26 that process packets.

A bus interface 25 couples CPU 22A, control memory 24A, tree memory 24B and buffer memory 24C to bus 18, providing a mechanism for communication between applications executed by server processor 22 and program instructions executed by CPU 22A from control memory 24A, which may be firmware instructions stored in non-volatile memory, downloadable software instructions stored in random access memory (RAM) or other suitable mechanism for providing instructions to CPU 22A for implementing methods in accordance with embodiments of the present invention. The connection forwarding portion of methods in accordance with embodiments of the present invention may also be implemented within protocol trees stored within tree memory 24B, whereby header mangling and packet routing are performed in accordance with a downloaded protocol processing tree.

A media interface 29 is coupled to local bus 28A for communicating network packets (generally transmission control protocol/Internet protocol (TCP/IP) packets over Ethernet) between external network devices and server 20. A switch/router 27 is shown connected to media interface 29, but multiple devices and other types of connections (e.g., bridges, other servers) may be provided depending on the network connections required for particular applications. The present invention provides a mechanism for filtered "TCP splicing" that resides entirely within server 20, so switch/router 27 may be a simple switch, in contrast to the switch of the above-incorporated patent application that provides TCP splicing using a mechanism distributed across a switch and the server and further in contrast to Layer-7 routing where filtering is performed in a switch.

Figure 3:
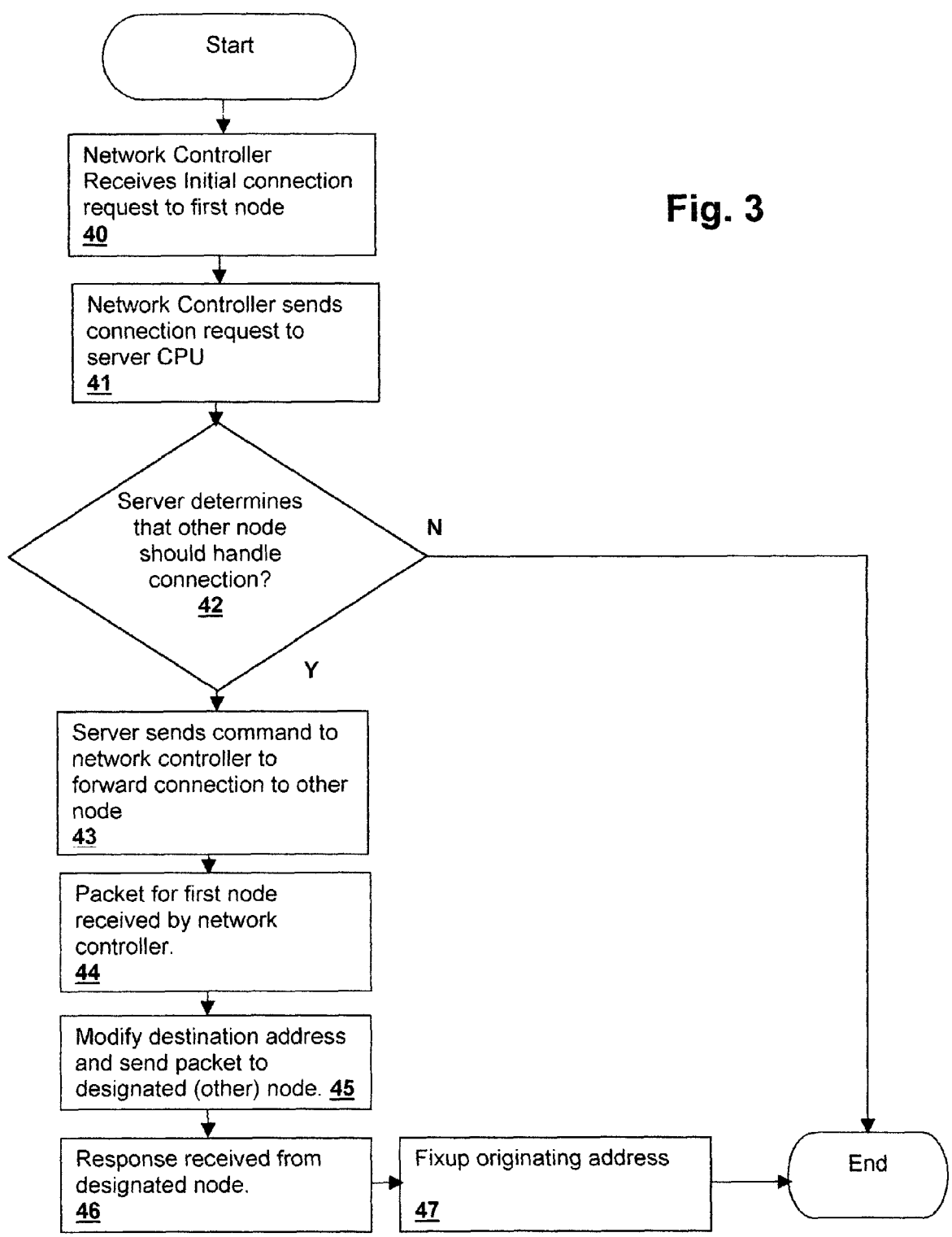
FIG. 3 is a flowchart depicting operation of a filtered connection forwarding scheme in accordance with an embodiment of the present invention.

Referring now to FIG. 3, a method in accordance with an embodiment of the invention as may be performed by network controller 16 of FIG. 1 or network processor 26 of FIG. 2 is depicted. When network controller 16 (or network processor 26) receives an initial connection request to a server node (step 40), network controller 16 (or network processor 26) sends the request to server processor 22. Server processor 22 analyzes the request to determine whether or not the connection should be handled by another node (decision 42). If server processor 22 determines that the connection should be handled by another node, server processor 22 sends a command (via a device driver) to network controller 16 (or network processor 26) to forward the connection to the other node (step 43). When a packet for the first node is received (step 44), the header is mangled by network controller 16 (or network processor 26) to contain a destination address of the other node identified in step 41. When a response is received from the other node, network controller 16 (or network processor 26) modifies the origin address of the packet to reflect a response from the first node (step 47) providing transparent splicing of the requested connection in response to the filter criteria. While the flowchart illustrates splicing of an original connection, a connection may be spliced at any time, depending on network or server conditions (e.g. buffer capacity for a given node). As network controller 16 (or network processor 26) is generally specifically adapted for packet processing, the techniques of the present invention yield very efficient results without an external intelligent switch. Communication of forwarding commands from server 10 (or server 20) to affect connection splicing can be made very rapidly, since network controller 16 and network processor 26 are coupled directly to their corresponding servers.

Figure 4A:
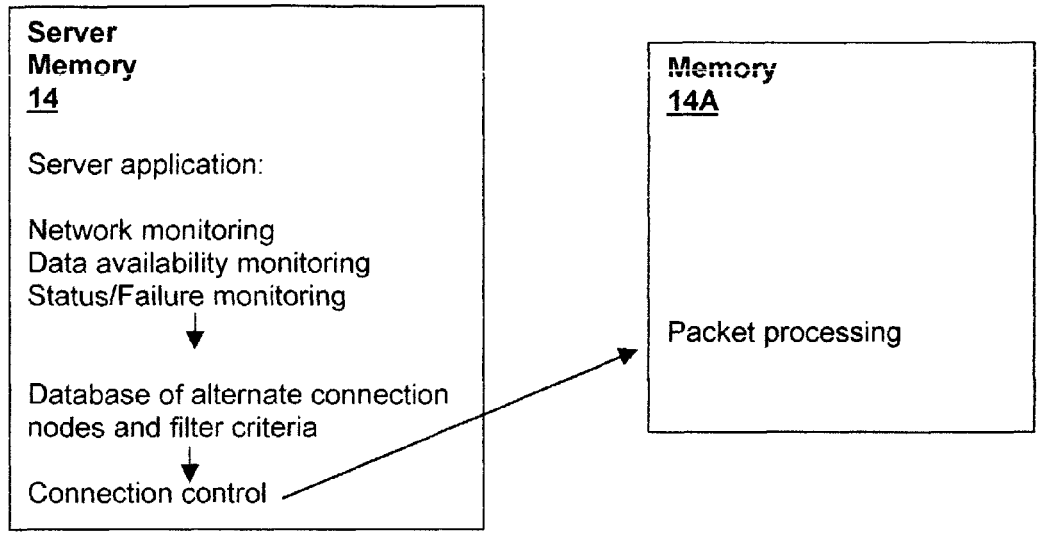
FIGS. 4A and 4B are pictorial diagrams showing the organization and intercommunication of software and/or firmware modules in accordance with embodiments of the present invention.

Referring now to FIG. 4A the organization and intercommunication of software and/or firmware modules in accordance with an embodiment of the present invention as may be implemented within server 10 is depicted. A server application resident within server memory 14 provides network monitoring based on information that may be received from other servers or status within the server itself. Status and failure monitoring may also be used to intelligently avoid nodes or servers that have failed or are producing error conditions. Data availability monitoring within server 10 and availability information communicated to server 10 from other servers may be used to determine a more appropriate connection based on information that a particular server may provide faster access to the data (e.g., a server already has particular HTML data loaded within its cache). The result of the network monitoring, status/failure monitoring and/or data availability monitoring can be used to build a database of filtering criteria and associated alternate connection nodes and mappings.

Controller memory 14A also contains firmware or downloadable software instructions for packet processing and performs required header manipulation for splicing connections in response to commands received from server processor 12. As described above, the splicing may be performed at connection establishment, or may be performed "on-the-fly" (luring transmission and reception of data for a particular connection.

Figure 4B:
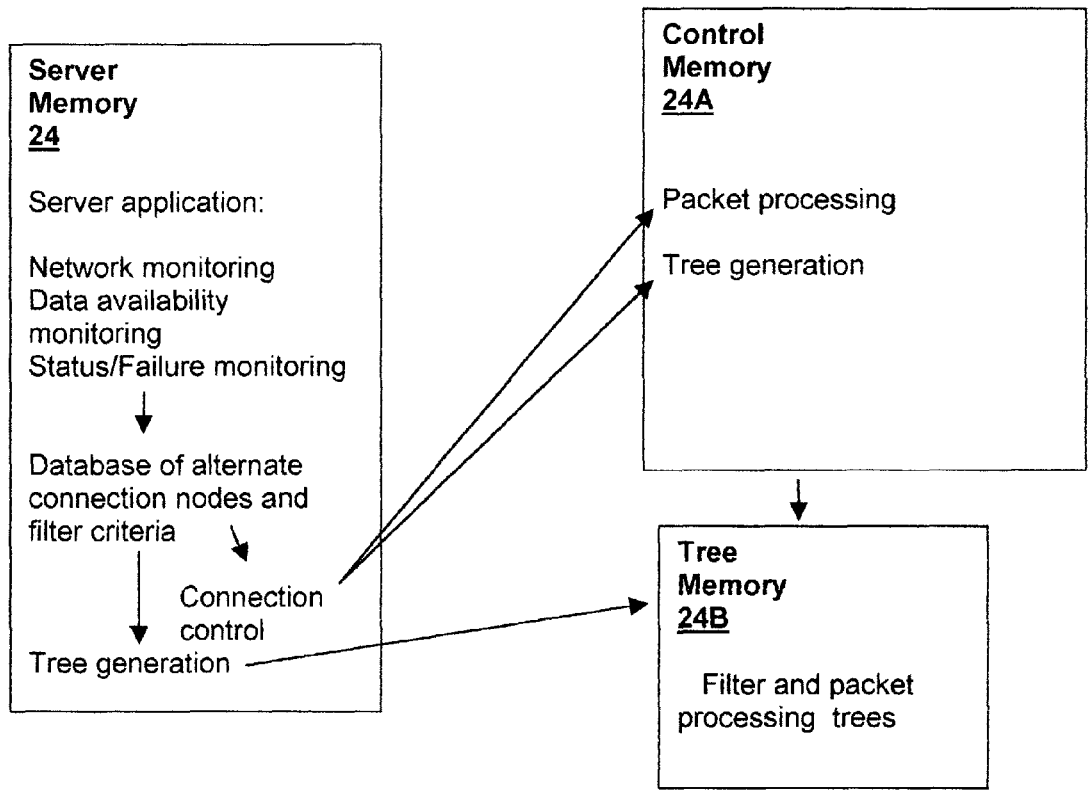

Referring now to FIG. 4B the organization and intercommunication of software and/or firmware modules in accordance with an embodiment of the present invention as may be implemented within server 20 is depicted. As described above for server 10, a server application resident within server memory 24 provides network monitoring based on information that may be received from other servers, status within the server itself or communicated from network processor 26 via a device driver resident in server memory 24. Status and failure monitoring may also be used to intelligently avoid nodes or servers that have failed or are producing error conditions. Data availability monitoring within server 20 and availability information communicated to server 20 from other servers may be used to determine a more appropriate connection based on information that a particular server may provide faster access to the data (e.g., a server already has particular HTML data loaded within its cache). The result of the network monitoring, status/failure monitoring and/or data availability monitoring can be used to build a database of filter criteria and associated alternate connection nodes and mappings. The database may be modified in response to internal connection monitoring and buffer monitoring program instructions resident within server memory 24. The server application may also build packet processing/filtering trees for download to tree memory 24B, or program instructions within control memory 24A may build or modify trees within tree memory 24B in response to commands received from server processor 22 to perform TCP splicing operations.

Control memory 24A may also contain firmware or downloadable software instructions for packet processing and perform required header manipulation for splicing connections in response to receiving commands from server processor 22. Alternatively or in concert, tree memory 24B may contain required information for performing the required header manipulation. As described above, the splicing may be performed at connection establishment, or may be performed "on-the-fly" during transmission and reception of data for a particular connection.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for forwarding connections at a server, comprising:
    receiving a first packet at a network controller of said server, wherein said first packet is destined for an original destination node of said server and was provided by an originating source;
    transmitting said first packet from said network controller to said original destination node;
    within said server, determining whether or not said original destination node should handle a connection associated with said first packet;
    in response to determining that said original destination node should not handle said connection, sending a command to said network controller to forward subsequent packets for said connection to an alternate destination node;
    in response to receiving said command at said network controller, modifying a destination address and an origin address of said subsequent packets within said network controller to produce modified packets containing a destination address of said alternate destination node and an origin address of a response node of said network controller; and
    transmitting said modified packets from said network controller to said alternate destination node, wherein said determining comprises detecting that a size of a packet buffer for said original destination node has exceeded a predetermined threshold, and wherein said sending is performed in response to said detecting.

2. A server system, comprising:
    a processing unit, including a server memory for storing server program instructions for execution by a server processor within said processing unit;
    a bus for interconnecting said processing unit with peripheral devices; and
    a network controller coupled to said bus for coupling said server system to a network, said network controller including a controller processor and a controller memory coupled to said controller processor for storing controller program instructions for execution by said controller processor, and wherein said controller program instructions include instructions for receiving a command from said server processor to forward a connection destined for an original destination node of said server to an alternate destination node;
    in response to said receiving and within said network controller, modifying a destination address and an origin address of packets associated with said connection to produce modified packets containing a destination address of said alternate destination node and an origin address containing an address of a response node of said network controller; and
    transmitting said modified packets from said network controller to said alternate destination node, and wherein said server program instructions comprise program instructions for detecting that a size of a packet buffer for the original destination node of the server has exceeded a predetermined threshold, and responsive to detecting that the size of the packet buffer for the original destination node of the server has exceeded the predetermined threshold, sending the command to the network controller to forward the connection.

* * * * *